United States Patent [19]

Viegas

[11] Patent Number: 4,922,727
[45] Date of Patent: May 8, 1990

[54] AIR DELIVERY SYSTEM FOR A TRANSPORT REFRIGERATION UNIT

[75] Inventor: Herman H. Viegas, Bloomington, Minn.

[73] Assignee: Thermo King Corporation, Minneapolis, Minn.

[21] Appl. No.: 401,711

[22] Filed: Sep. 1, 1989

[51] Int. Cl.⁵ ............................................. B60H 1/32
[52] U.S. Cl. .................................. 62/239; 62/429; 474/84
[58] Field of Search ............... 62/239, 323.1, 429; 474/84–89

[56] References Cited

U.S. PATENT DOCUMENTS

| | | | |
|---|---|---|---|
| 2,518,284 | 8/1950 | Clark | 62/429 X |
| 3,415,072 | 12/1968 | White | 62/429 X |
| 4,144,719 | 3/1979 | Williams et al. | 62/239 |
| 4,551,986 | 11/1985 | Anderson et al. | 62/239 |
| 4,634,403 | 1/1987 | Peabody et al. | 474/85 X |
| 4,662,861 | 5/1987 | Seung et al. | 474/86 X |
| 4,735,055 | 4/1988 | Taylor | 62/115 |
| 4,770,002 | 9/1988 | Viegas et al. | 62/239 |
| 4,811,569 | 3/1989 | Welch et al. | 62/323.1 X |
| 4,854,923 | 8/1989 | Sexton et al. | 474/84 |

Primary Examiner—William E. Tapolcai
Attorney, Agent, or Firm—D. R. Lackey

[57] ABSTRACT

An air delivery system for a transport refrigeration unit having a dual speed prime mover, a compressor, a condenser, an evaporator, and first and second air delivery blowers for the condenser and evaporator, respectively. The speed of the first blower is directly proportional to the speed of the prime mover and the second blower is driven by an adjustable speed arrangement. The adjustable speed arrangement includes an electric clutch and a one-way clutch. The electric clutch, when energized, selects a predetermined speed of the evaporator blower, which is greater than the speed of the condenser blower, and when the electric clutch is deenergized the evaporator blower is driven at the same speed as the condenser blower, via the one-way clutch.

4 Claims, 2 Drawing Sheets

AIR DELIVERY SYSTEM FOR A TRANSPORT REFRIGERATION UNIT

BACKGROUND OF THE INVENTION

1. Field of the Invention

The invention relates in general to transport refrigeration, and more specifically to air delivery systems for transport refrigeration units.

2. Description of the Prior Art

It is common in the transport refrigeration industry to have a dual speed prime mover, such as a Diesel engine, connected to drive a refrigerant compressor at a selected one of high and low speeds, such as 2200 RPM and 1400 RPM. The speed setting is responsive to the cooling or heating capacity demanded by a thermostat which compares the temperature of a served space with a temperature set point. If the condenser and evaporator blowers are directly driven by the engine, the air flow drops when the engine speed drops. This is desirable for the condenser blower, as the requirements on the condenser blower are reduced at the lower refrigeration capacity. This may or may not be desirable for the evaporator blower, depending upon the temperature set point. If the set point is set for unfrozen loads, such as produce, it is desirable to maintain a high air circulation rate in the served space at all times, regardless of compressor speed, in order to maintain a uniform temperature in the cargo and prevent "top freezing". If the set point is set for frozen loads, the temperature variation of the served space is not as critical, as long as all points of the cargo are well below the freezing point. Thus, reducing the air flow in the served space at the lower speed is beneficial, as the reduced power draw by the blower and the reduction of "fan heat" due to reduced compression and agitation of the air, translate into increased cooling capacity, adding as much as 10 to 15% capacity, and reduced fuel consumption as well.

Thus, while some systems include means for automatically maintaining the evaporator air flow constant regardless of compressor speed, this is not always advantageous, and can be a disadvantage.

In my co-pending application Ser. No. 270,861 filed Nov. 14, 1988, entitled "Air Delivery System For A Transport Refrigeration Unit", now U.S. Pat. No. 4,878,360, there is disclosed an adjustable speed arrangement which includes a jack shaft driven by the prime mover. The jack shaft has a fixed pulley which drives the condenser blower at a speed directly proportional to the speed of the prime mover, and a variable pulley. The variable pulley is linked by a belt which also links a pulley which drives the evaporator blower, and an idler pulley. The position of the idler pulley is controlled by a linear actuator to tension the belt and select the pitch diameter of the variable pulley which will provide the desired evaporator air flow for the temperature set point, at the current prime mover speed. While this arrangement works well, it would be desirable, and it is the object of the present invention, to improve upon the arrangement of my co-pending application, providing a simpler and lower maintenance air delivery arrangement for a transport refrigeration system in which the speed of the condenser blower is directly proportional to the speed of the prime mover, while the speed of the evaporator blower is selectable.

SUMMARY OF THE INVENTION

Briefly, the present invention is an air delivery system for a transport refrigeration unit which includes a prime mover having at least two operational speeds, such as a Diesel engine, a compressor, a condenser, an evaporator, a blower for the condenser, a blower for the evaporator, and an adjustable speed arrangement for the evaporator blower. As used herein, the term "blower" means any suitable air delivery unit, including centrifugal blowers and axial flow fans.

The present invention eliminates the variable pulley and linear actuator of my co-pending application, utilizing an electric clutch and a one-way clutch to accomplish the desired functions.

More specifically, the adjustable speed arrangement of the present invention includes a jack shaft having a first pulley fixed to the jack shaft, a second pulley journaled for rotation on the jack shaft, and a third pulley fixed to the jack shaft. The hereinbefore mentioned electric clutch is disposed to lock the second pulley to the jack shaft when the electric clutch is energized.

The adjustable speed arrangement further includes an output shaft and the hereinbefore mentioned one-way clutch. A fourth pulley is fixed to the outer race of the one-way clutch and to the condenser blower, and a fifth pulley is fixed to the output shaft. The output shaft, which is directly connected to the evaporator blower, is fixed to the inner race of the one-way clutch. The output shaft cannot run slower than the outer race, but it can run faster.

A first belt links the first and fourth pulleys, and a second belt links the second and fifth pulleys. The third pulley is linked to a prime mover.

When the prime mover is operating at high speed, the electric clutch is de-energized. The one-way clutch locks up and turns the output shaft, driving both the condenser and evaporator blowers at high speed. When the prime mover is operating at low speed, the condenser blower operates at low speed. If it is desirable to maintain the evaporator blower at high speed, the electric clutch is energized when the prime mover switches from high to low speed, locking the second pulley to the jack shaft. The ratio of the second and fifth pulleys maintains the output shaft at the desired higher speed, and thus the output shaft and the inner race overrun the outer race of the one-way clutch. If the transport refrigeration unit is controlling a frozen load, it may be desirable to drop the speed of the evaporator blower when the prime mover switches to low speed. In this event, the electric clutch is not energized, and the outer race of the one-way clutch locks up to drive the output shaft at the same speed as the condenser blower. Whether or not the electric clutch is energized when the prime mover switches from high to low speed may be automatically determined by the selected set point temperature. When the selected set point temperature is above a pre-selected temperature, the electric clutch is energized when the prime mover switches to low speed, and when the set point temperature is below the pre-selected temperature, the electric clutch is de-energized during both the high and low speed modes of the prime mover.

BRIEF DESCRIPTION OF THE DRAWINGS

The invention may be better understood and further advantages and uses thereof more readily apparent when considered in view of the following detailed description of exemplary embodiments, taken with the accompanying drawing, in which.

DESCRIPTION OF PREFERRED EMBODIMENTS

U.S. Pat. No. 4,551,986, which is assigned to the same assignee as the present application, discloses a transport refrigeration unit of the type which may be modified to utilize the teachings of the invention, and this patent is hereby incorporated into the specification of the present application by reference.

Figure 1:
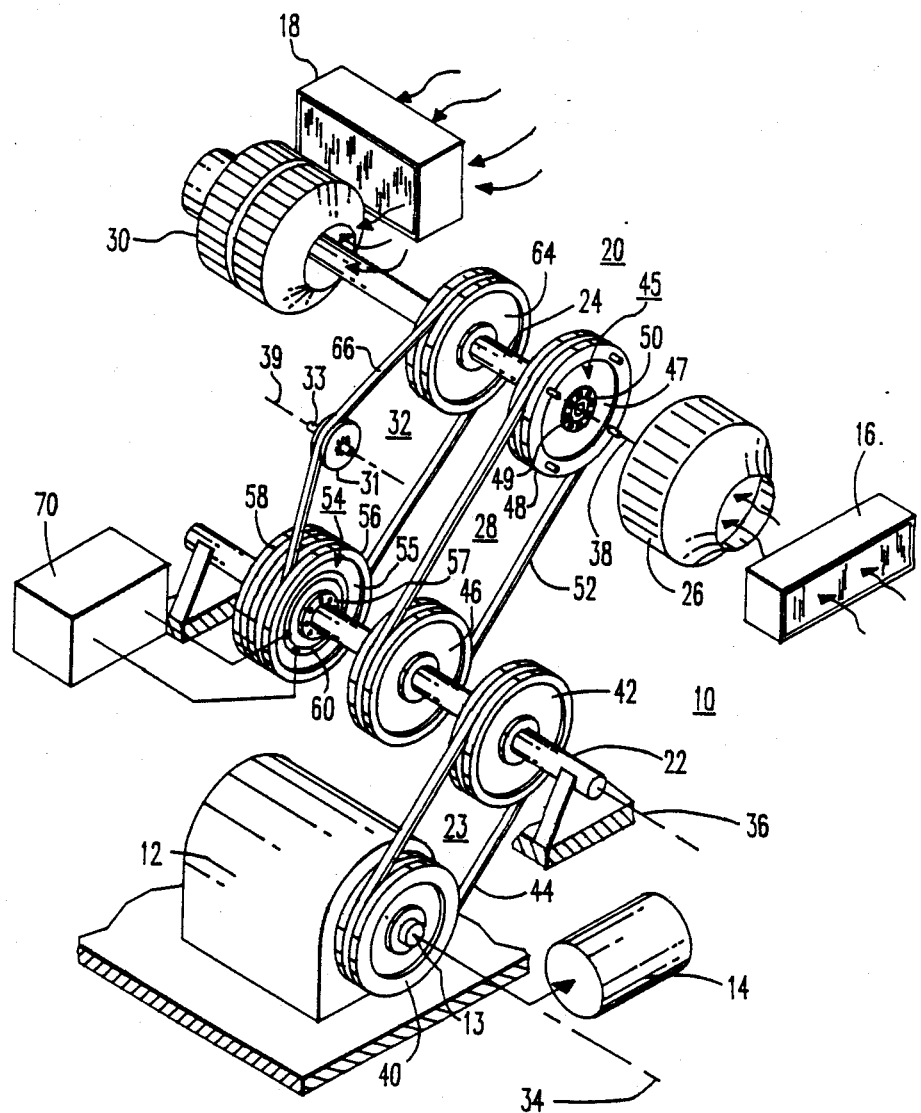
FIG. 1 is a perspective view of a transport refrigeration system having an air delivery arrangement constructed according to the teachings of the invention.

Referring now to FIG. 1, there is shown a diagrammatic perspective view of a transport refrigeration system 10 constructed according to the teachings of the invention. Transport refrigeration system 10 includes a prime mover 12, which is preferably a Diesel engine having at least two solenoid selectable operational speeds, such as 2200 RPM and 1400 RPM, commonly called "high speed" (HS) and "low speed" (LS), respectively. Prime mover 12 includes a crankshaft 13 which drives a refrigerant compressor 14, either directly or via a pulley arrangement, and compressor 14 circulates refrigerant in a closed path which includes a condenser 16 and an evaporator 18. U.S. Pat. No. 4,735,055, which is assigned to the same assignee as the present application, may be referred to for a typical refrigerant circuit for transport refrigeration systems, and this patent is hereby incorporated into the specification by reference.

Transport refrigeration system 10 includes an air delivery arrangement 20 for the condenser 16 and evaporator 18 which includes a jack shaft 22 journaled for rotation and driven by the prime mover 12 by a drive arrangement 23, an output shaft 24 journaled for rotation, a condenser blower 26, a fixed speed drive arrangement 28 for driving the condenser blower 26 at a speed directly proportional to the speed of the prime mover 12, an evaporator blower 30, and an adjustable speed drive arrangement 32 for driving the evaporator blower 30 at selectable speeds. Arrangement 32 includes an idler pulley 31 journaled for rotation on a shaft 33. Longitudinal axes 34, 36, 38 and 39 of crankshaft 13, jack shaft 22, output shaft 24, and idler pulley shaft 33, respectively, are all disposed in a predetermined spaced, parallel relation.

Drive arrangement 23 for driving jack shaft 22 includes a crankshaft pulley 40, a driven pulley 42 fixed to jack shaft 22, and a V-belt 44 which links or couples pulleys 40 and 42.

Drive arrangement 28 for driving condenser blower 26 at a speed directly proportional to the speed of prime mover 12 includes a driving pulley 46 fixed to rotate with jack shaft 22, a one-way clutch 45 having an outer race 47, an inner race 49, and a one-way clutch 50, with output shaft 24 being fixed to inner race 49. A pulley 48 is fixed to the outer race 47 of one-way clutch 45, as is the condenser blower 26. A V-belt 52 links pulleys 46 and 48.

Drive arrangement 32 for driving evaporator blower 30 at selectable speeds includes an electric clutch 54 having a clutch rotor 55 to which a pulley 56 is fixed, with clutch rotor 55 being journaled for rotation on jack shaft 22 via bearings 57. An armature plate 58 is fixed to rotate with jack shaft 22. A stationary electrical coil 60 extends into a cavity defined by the rotatable clutch rotor 55, completing the electric clutch 54. An electric clutch suitable for this application is disclosed in detail in U.S. Pat. No. 4,770,002, which is assigned to the same assignee as the present application.

Drive arrangement 32 further includes a driven pulley 64 fixed to output shaft 24, and a V-belt 66 which links pulleys 56, 64, and idler pulley 31. Jackshaft 22 is used to adjust the tension in belts 44 and 52, and, following the jackshaft adjustment, idler pulley 31 is adjusted to tighten belt 66. Refrigerant control 70 provides a voltage for energizing electric clutch 54 at the appropriate time, e.g., when the prime mover 12 switches from high to low speed with the set point temperature above a predetermined setting.

Figure 2:
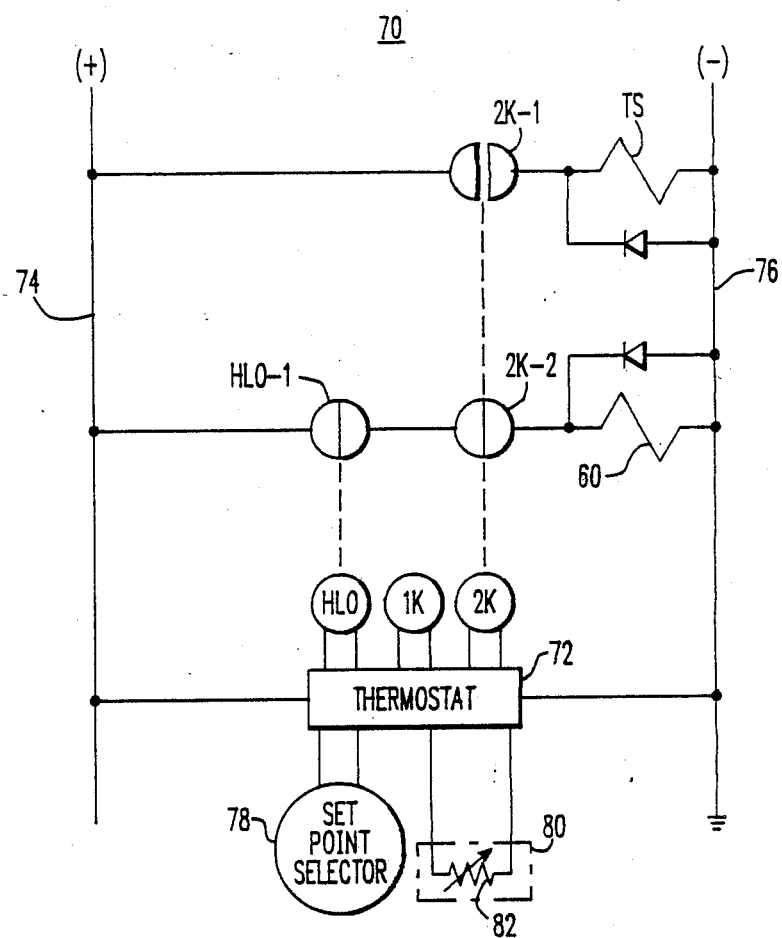
FIG. 2 is a schematic diagram of refrigeration control illustrating an exemplary control arrangement which may be used to control the air delivery arrangement of the invention.

FIG. 2 is a schematic diagram which sets forth an exemplary control arrangement which may be used for refrigeration control 70. Only the control elements necessary to understand the arrangement are illustrated, in order to simplify the drawing. More specifically, FIG. 2 illustrates a thermostat 72 connected between conductors 74 and 76 of an electrical power supply. Thermostat 72 is responsive to the selection of a set point selector 78. Thermostat 72 senses the temperature of a controlled space 80 via a sensor 82, it compares the sensed temperature with the setting of set point selector 78, and in response to the comparison it initiates high and low speed heating and cooling cycles, as appropriate, via a heat relay 1K and a speed relay 2K.

Heat relay 1K, when de-energized, indicates a need for a cooling mode, and when energized it indicates a need for a heating mode. Since the present invention is not concerned with heating and cooling per se, contacts and control elements responsive to heat relay 1K are not shown.

Speed relay 2K, when energized, selects a high speed mode of prime mover 12, such as 2200 RPM, and when de-energized it selects a low speed mode, such as 1400 RPM. Speed relay 2K has a normally open contact set 2K-1 which energizes a throttle solenoid TS, when closed, with throttle solenoid TS being operatively associated with the throttle of prime mover 12.

Control 70 includes a heat lock-out relay HLO responsive to the temperature selected by the set point selector 78. When the temperature selected is above a predetermined point, relay HLO is de-energized, and when the temperature selected is below the predetermined point relay HLO is energized. The "predetermined point" is usually selected such that when a temperature is selected by set point selector 78 which is below the predetermined point it signifies that the load being conditioned is a frozen load, with the usual purpose of relay HLO being to lock out or prevent thermostat 72 from initiating a heating mode while relay HLO is energized.

Coil 60 of electric clutch 54 is connected to be energized by a normally closed contact 2K-2 of the speed relay 2K and a normally closed contact HLO-1 of the heat lock out relay HLO. Thus, when speed relay 2K is energized, calling for high speed, contact 2K-2 will be open and electric coil 60 cannot be energized. When speed relay 2K is de-energized, contact 2K-2 will close, enabling electric coil 60. Electric coil 60 will be energized if contact HLO-1 of relay HLO is closed, indicating relay HLO is de-energized. As hereinbefore stated, relay HLO will be de-energized when the set point selector 78 is set for a temperature above the predetermined heat lock out temperature. When relay HLO is energized, indicating a frozen load is in the served space 80, electric coil 60 cannot be energized regardless of the speed setting of the prime mover 12.

In the operation of air delivery arrangement 20, when prime mover 12 is operating at high speed, it is desirable that both the condenser and evaporator blowers 26 and 30, respectively, operate at high speed. Electric clutch 54 will not be energized and pulley 56 will free wheel on jack shaft 22. Pulley 46 drives pulley 48 and the condenser blower 26 at high speed. The one-way clutch 45 locks up to engage and drive output shaft 24, as the inner race 49 cannot turn slower than the outer race 47. Thus, evaporator blower 30 is driven at the same speed as the condenser blower 26. The diameters of pulleys 46 and 48 determine the rotational speed of shaft 24 during the high speed mode. Pulley 64 will drive pulley 56 during this time, but as hereinbefore stated, pulley 56 merely free wheels on its bearings.

When the prime mover 12 drops to its low speed setting, it will first be assumed that it is desired to operate the evaporator blower 30 at a higher speed than the condenser blower 26, and thus electric coil 60 of electric clutch 54 will be energized by control 70. When electric clutch 54 is energized, clutch rotor 55 will be magnetically clamped to armature plate 58 and pulley 56 will thus be locked to jack shaft 22. Pulley 56 will now drive pulley 64, shaft 24 and the evaporator blower 30. The diameters of pulleys 56 and 64 are selected to provide the high air delivery rate desired for the evaporator blower 30, which, for example, may be the same rate as when the prime mover 12 is operating at high speed. During the low speed mode of prime mover 12, pulley 46 will drive pulley 48, the outer race 47 and condenser blower 26 at a speed proportional to the lower prime mover speed, which is less than the speed of shaft 24. The inner race 49 of one-way clutch 45 will now overrun the outer race 47.

If, when the prime mover drops to low speed it is not desirable to maintain the high evaporator air flow delivery rate, e.g., a frozen load is in conditioned space 80, electric coil 60 will not be energized, and the evaporator blower 30 will be driven by the one-way clutch 45 as described during the high speed description, and thus both the condenser and evaporator blowers 26 and 30, respectively, will operate at low speed.

In summary, there has been disclosed a new air delivery system for a transport refrigeration unit which provides individual selectable control over the evaporator blower speed, enabling desired speeds to be selected for both fresh and frozen loads, at different prime mover speeds.

I claim:

1. An air delivery system for a transport refrigeration unit having a prime mover, a condenser, an evaporator, and condenser and evaporator air delivery means, comprising:

a first shaft driven by the prime mover,
a first pulley fixed to said first shaft,
an electric clutch,
a second pulley connectable to said first shaft via said electric clutch,
a second shaft spaced from said first shaft,
said second shaft being connected to drive the evaporator air delivery means,
a one-way clutch having an inner race fixed to said second shaft and an outer race,
a third pulley fixed to the outer race of said one-way clutch,
said third pulley being connected to drive the condenser air delivery means,
a fourth pulley fixed to said second shaft,
first belt means linking said first and third pulleys to drive the condenser air delivery means at a speed directly proportional to the speed of the prime mover,
and second belt means linking said second and fourth pulleys,
whereby engagement of the electric clutch drives the second shaft and said evaporator air delivery means faster than the condenser air delivery means, and disengagement of the electric clutch results in the faster than the condenser air delivery means, and disengagement of the electric clutch results in the evaporator air delivery means being driven at the same speed as the condenser air delivery means, via said one-way clutch.

2. The air delivery system of claim 1 including a fifth pulley fixed to the first shaft, a sixth pulley fixed to the prime mover, and third belt means linking said fifth and sixth pulleys.

3. The air delivery system of claim 1 wherein the prime mover is a dual speed prime mover, having first and second predetermined operating speeds, with the first speed being higher than the second, and the electric clutch includes an electrical coil, and including control means for enabling the energization of said electrical coil only when the prime mover is operating at said second speed.

4. The air delivery system of claim 3 including means for selecting the temperature to be maintained by the transport refrigeration system, and wherein the control means includes means responsive to the temperature selected for enabling the energization of the electrical coil only when the temperature selected is above a predetermined value.

* * * * *